United States Patent
Poornachandran et al.

(10) Patent No.: US 12,481,504 B2
(45) Date of Patent: Nov. 25, 2025

(54) APPARATUS AND METHOD FOR SECURE INSTRUCTION SET EXECUTION, EMULATION, MONITORING, AND PREVENTION

(71) Applicant: Intel Corporation, Santa Clara, CA (US)

(72) Inventors: Rajesh Poornachandran, Portland, OR (US); Vincent Zimmer, Issaquah, WA (US); Prashant Dewan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 937 days.

(21) Appl. No.: 17/131,289

(22) Filed: Dec. 22, 2020

(65) Prior Publication Data
US 2022/0197678 A1     Jun. 23, 2022

(51) Int. Cl.
*G06F 9/30* (2018.01)
*G06F 21/53* (2013.01)

(52) U.S. Cl.
CPC ...... *G06F 9/30181* (2013.01); *G06F 9/30145* (2013.01); *G06F 9/3017* (2013.01); *G06F 21/53* (2013.01)

(58) Field of Classification Search
CPC .............. G06F 9/3017; G06F 9/30181; G06F 9/30174; G06F 9/30189; G06F 9/30145; G06F 21/75; G06F 21/53
See application file for complete search history.

(56) References Cited

U.S. PATENT DOCUMENTS

| | | | |
|---|---|---|---|
| 10,496,461 B2 * | 12/2019 | Lau | G06F 11/0772 |
| 2005/0050524 A1 | 3/2005 | Booker et al. | |
| 2010/0257338 A1 * | 10/2010 | Spracklen | G06F 9/30145 |
| | | | 712/E9.016 |

(Continued)

FOREIGN PATENT DOCUMENTS

GB     2461848 A     1/2010

OTHER PUBLICATIONS

European Search Report and Search Opinion, EP App. No. 21196453.1, Feb. 16, 2022, 9 pages.
Office Action, EP App. No. 21196453.1, Oct. 24, 2024, 7 pages.

*Primary Examiner* — Courtney P Spann
(74) *Attorney, Agent, or Firm* — NICHOLSON DE VOS WEBSTER & ELLIOTT LLP

(57) ABSTRACT

Apparatus and method for secure instruction set execution, emulation, monitoring, and prevention. A processor embodiment includes registers, evaluator, and execution unit. The registers are to store rules which specify actions to be taken with respect to one or more instructions. The evaluator is to detect a request to execute a first instruction and to evaluate the first instruction based on the rules stored in the one or more registers. The evaluator is further to block execution of the first instruction when a first rule corresponding to the first instruction specifies that execution of the first instruction is prohibited, and to allow execution of the first instruction when there is no rule in the one or more registers specifying that the execution of the first instruction is prohibited. The execution unit is to execute the first instruction when the evaluator allows execution of the first instruction.

25 Claims, 13 Drawing Sheets

(56) References Cited

U.S. PATENT DOCUMENTS

| | | | |
|---|---|---|---|
| 2013/0212577 A1* | 8/2013 | Nayak | G06F 9/45558 |
| | | | 718/1 |
| 2014/0281398 A1* | 9/2014 | Rash | G06F 9/382 |
| | | | 712/208 |
| 2017/0124358 A1* | 5/2017 | Krithivas | G06F 21/88 |
| 2017/0168844 A1* | 6/2017 | Swanson | G06F 21/577 |
| 2018/0136967 A1* | 5/2018 | Asbe | G06F 21/53 |
| 2019/0012455 A1 | 1/2019 | Barnes | |
| 2019/0044971 A1 | 2/2019 | Sukhomlinov et al. | |
| 2021/0042100 A1* | 2/2021 | Boling | G06F 8/44 |

\* cited by examiner

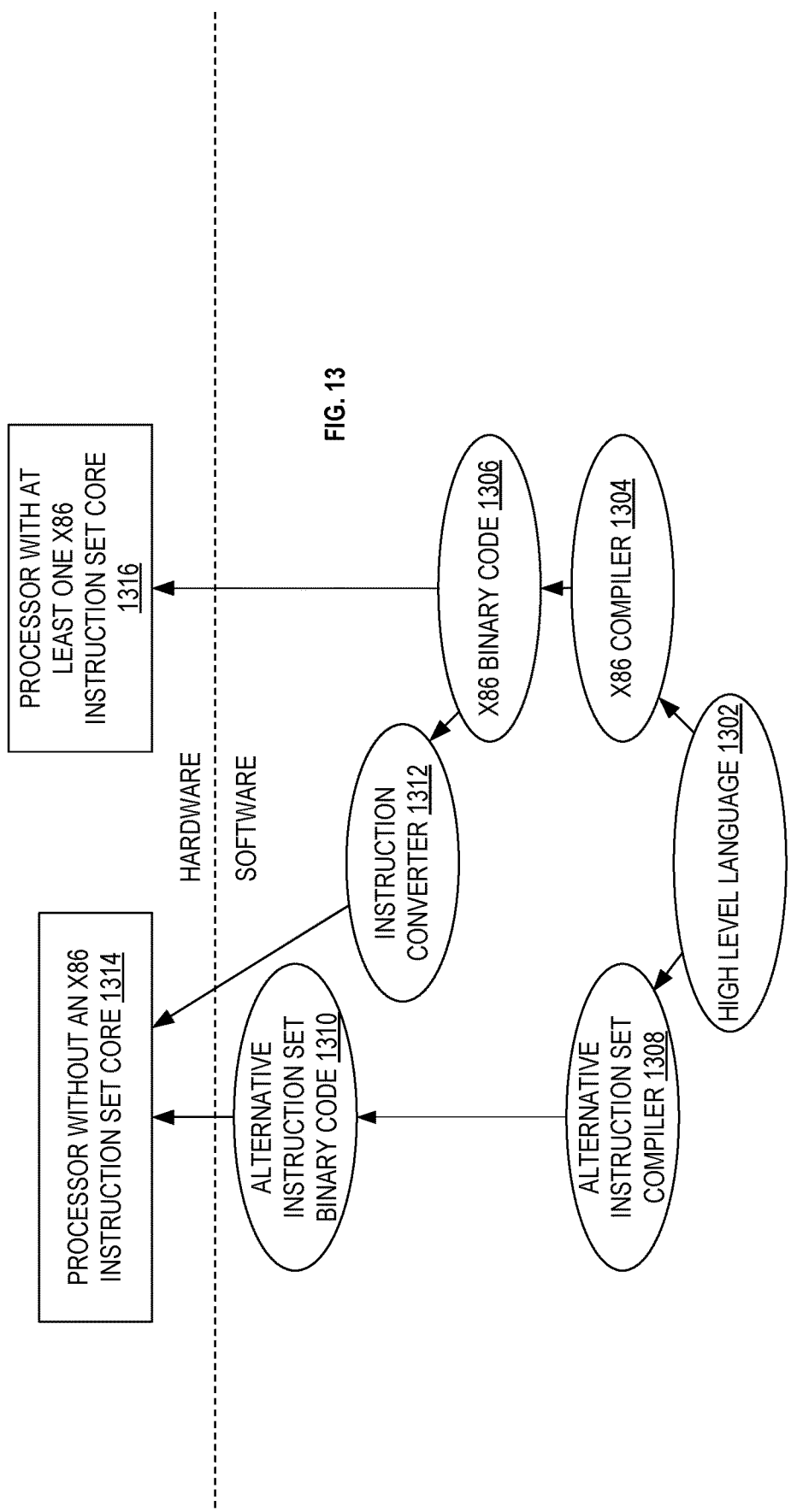

APPARATUS AND METHOD FOR SECURE INSTRUCTION SET EXECUTION, EMULATION, MONITORING, AND PREVENTION

TECHNICAL FIELD

Embodiments of the invention described herein relate generally to instruction set architecture in a computer processing system. In particular, the disclosure relates to the control of instruction set support in different processors.

BACKGROUND ART

An instruction set, or instruction set architecture (ISA), is the part of the computer architecture that relates to programming, including the native data types, instructions, register architecture, addressing modes, memory architecture, interrupt and exception handling, and external input and output (I/O). The term "instruction" generally refers to macro-instructions, which are instructions that are provided to the processor for execution, as opposed to micro-instructions or micro-ops (uops), which result from a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. While processors with different microarchitectures can share a common instruction set, not all instruction sets are, or should be, supported across different processor microarchitectures. In some use cases, it is highly desirable to be able to control the instruction set that is supported on a particular processor.

BRIEF DESCRIPTION OF THE DRAWINGS

The invention may best be understood by referring to the following description and accompanying drawings used to illustrate embodiments of the invention. In the drawings:

FIG. 13 illustrates a block diagram contrasting the use of a software instruction converter to convert binary instructions in a source instruction set to binary instructions in a target instruction set according to embodiments of the invention.

DETAILED DESCRIPTION

Figure 1:
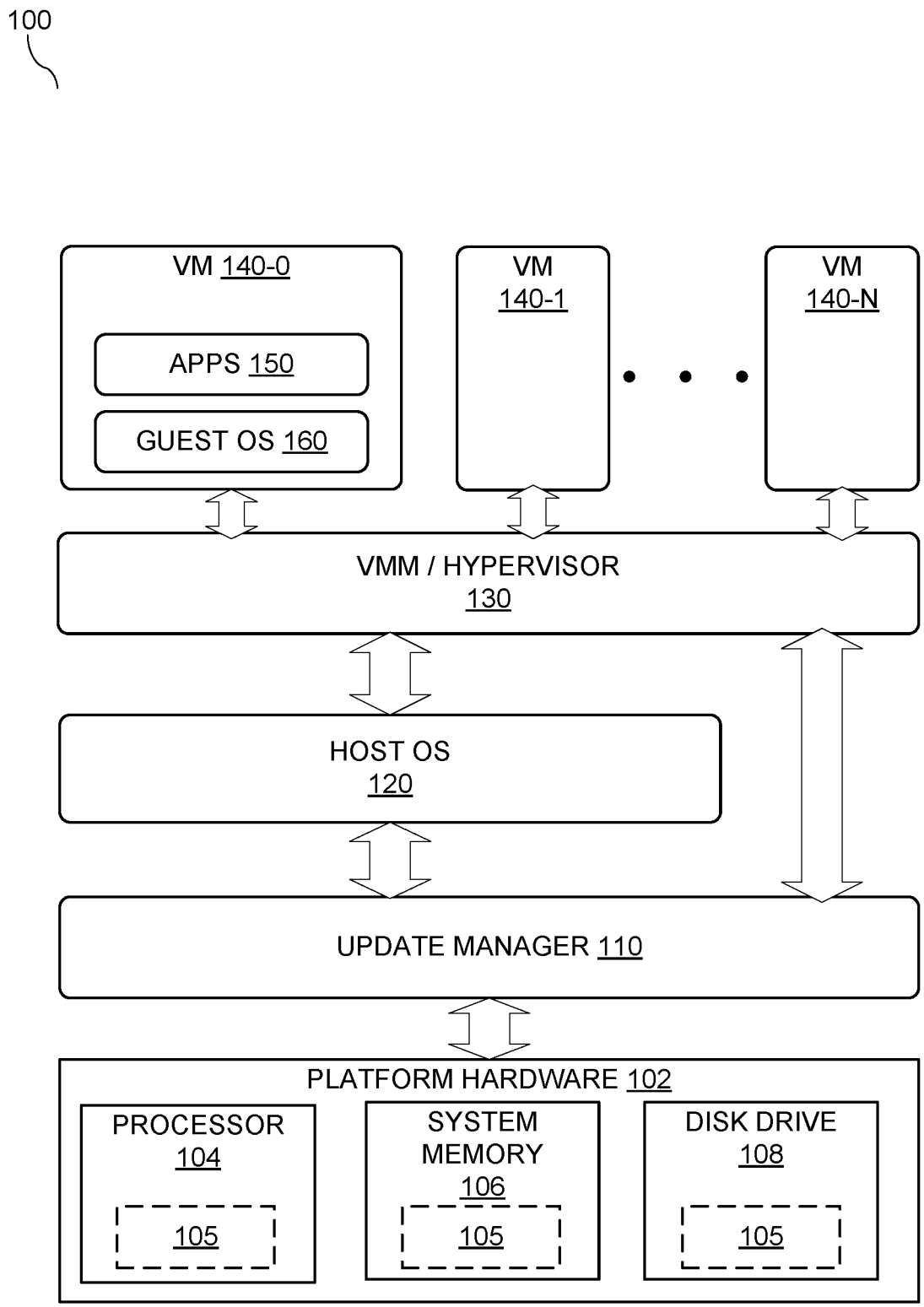
FIG. 1 is a block diagram illustrating an embodiment of a computer system platform on which various aspect of the present disclosure can be implemented.

Embodiments of processor, method, and machine-readable medium for secure instruction execution, emulation, monitoring, and prevention are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Today, key cloud service providers (CSPs) offer cloud instances of processors based on their total cost of ownership (TCO) metrics and availability. CSPs typically offer a variety of processor models and types, each providing varying degrees of specialization and performance. Naturally, the latest processor offerings tend to support the newest instruction sets and features that may not be available on older processors. To maintain uniformity and simplify the offerings, it is common for CSPs to expose to customers and applications only the least-common denominator instruction set architecture (ISA) shared between different processor offerings. In doing so, instruction sets and features that are not supported across all processors are not presented. However, just because some instruction sets and features are not be explicitly offered does not mean they are inaccessible. In some cases, if the operating system (OS) or the virtual machine manager (VMM) cannot properly detect and trap the hidden instruction sets or features, a processor has no effective way to prohibit an unlicensed software flow from making unauthorized calls to these instructions and features. Even when images of executables are statically scanned before execution, an offending program can simply just-in-time generate offending instruction streams prior to execution to circumvent the scanning.

Described in this disclosure are various embodiments for implementing Secure ISA Execution, Emulation, Monitoring and Prevention (SIEEMP) in a computer system for addressing these issues. One aspect of SIEEMP helps inhibit unauthorized utilization of hidden instructions and features in a processor. This is important from a security perspective because a lot of VMM introspection techniques rely on the least-common denominator behavior. Without proper mechanisms to prevent unauthorized use of processor features, it is difficult for CSPs to justify charging extra for exposing new processor capabilities on premium VM instances. Besides showcasing processor-specific features, an aspect of the present disclosure also helps enabling support for new instruction sets and features on older processors through firmware and/or microcode emulation to allow for more software consistency. This allows chipmakers and their partners to evaluate upcoming ISAs for joint co-engineering/research, as well as determining real-world deployment challenges relating to security, quality and reliability.

FIG. 1 is a block diagram illustrating an embodiment a computer system platform on which various aspects of SIEEMP may be implemented. According to an embodiment, platform 100 includes platform hardware 102 and various software and/or firmware components executed thereon. Platform hardware 100 may include one or more processors or central processing units (CPUs) 104, one or more data storage devices (disk drive) 108, and one or more memory devices to implement a system memory 106. The components of platform hardware 102 may communicate with one another via bus or other suitable interconnects (not shown). While processor 104, system memory 106, and disk drive 108 are each shown as a single block, it is understood that any number of these components may be implemented in platform hardware 102. Furthermore, platform hardware 102 may include other hardware components that are omitted in FIG. 1 to avoid obscuring the underlying invention.

Processor 104 may include one or more cores to execute various software components, such as modules and applications, stored in non-volatile storage devices (e.g., disk drive 108). During boot up or run-time operations, software and/or firmware components are loaded into system memory 106 and executed by processor 104 as processes, threads, or the like. Under a typical system boot for platform hardware 102, firmware will be loaded and configured in system memory 106, followed by booting of the host operating system (OS) 120. The virtual machine manager (VMM) and/or Hypervisor 130 running on the host OS may be employed to launch various virtual machines (VMs) 140-0-140-N. Each VM may be configured to use various portions (e.g., address spaces) of system memory 106. In turn, the VMs may each run a respective guest operating system 160 with applications 150 executed thereon.

During run-time operations, VMM 130 may also enable reconfiguration of various system resources, such as system memory 106, processor 104, and disk drive 108. Generally, the VMs provide abstractions (in combination with VMM 130) between its guest operating system and the underlying platform hardware 102 to enable the sharing of hardware resources. From their viewpoint, each guest operating system "owns" the entire platform and is unaware of the existence of other guest operating systems running on different virtual machines. In reality, each guest operating system merely has access to the portion of resources allocated to it by the VMM 130.

Platform 100, according to an embodiment, further include an update manager 110 to process requests from the VMM 130 and the OS 120. The requests may include requests to write to one or more registers of processor 104, which may be integral or coupled to the processor. Exposing the registers to the VMM and OS allows them to configure specific ISA behavior. According to an embodiment, the registers store rules, which may also be referred to as configurations, used to implement secure instruction execution, emulation, monitoring, and prevention (SIEEMP) on processor 104. Specifically, the rules may specify how certain instructions or instruction sets are to be handled by the processor 104. For example, a particular instruction may correspond to one or more of the rules and each rule may indicate one or more actions to be taken by the processor 104 with respect to the instruction. The actions may include, but are not limited to: 1) execute the instruction as normal, 2) emulate the execution of the instruction, 3) monitor the execution of the instruction and generate the relevant data or metrics, 4) prevent the execution of the instruction, 5) generate one or more interrupts or messages, or 6) take policy-based action in accordance to a set of configurable policies. Each of the actions may be distinguished based on the bits or bit values stored in the register. According to an embodiment, the processor may execute a particular instruction when certain bits in the register indicate a first value, emulate the execution of the particular instruction when the bits indicate a second value, and block execution of the instruction when the bits indicate a third value.

While the SIEEMP rules 105 are stored in registers of processor 104 in the examples disclosed herein, it is understood that other storage locations, such as those in the system memory 106 and the disk drive 108, may also be used to for rule storage. In one embodiment, responsive to a write request to store or modify the bits in a register, various checks may be performed by the update manager to validate the request and/or the specified rule. For example, the update manager may check that the rules are intended and/or appropriate for the processor(s) in the platform hardware 102. The update manager may also verify that the request contains the valid header, loader version, and/or checksum before the rule is stored. The write may also be authenticated and checked for the proper signature. Once validated, the rule may be stored and/or a valid bit corresponding to the rule may be set to indicate the rule is valid. If validation fails, the rule may be blocked, deleted, or marked as invalid. In some embodiments, the update manager may be implemented as part of the basic input/output system (BIOS) of the hardware platform. In some embodiments, the BIOS includes the software or firmware for performing the operations of the update manager.

Figure 2:
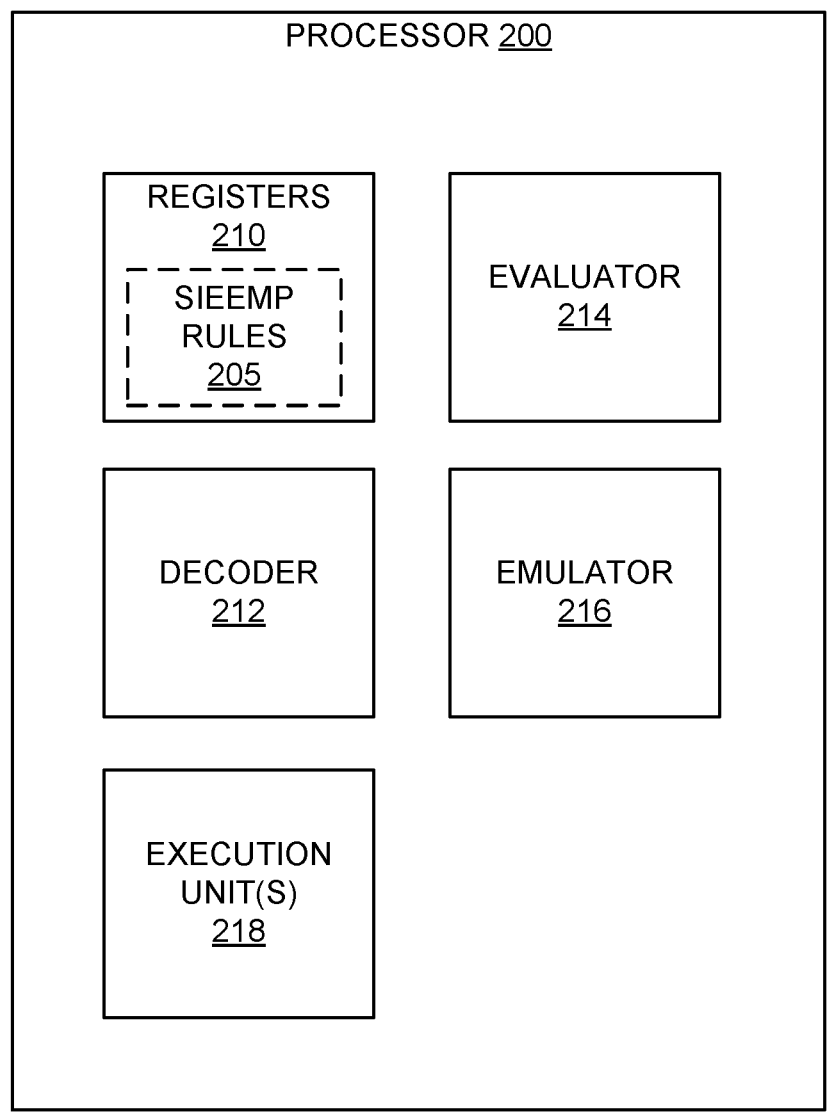
FIG. 2 is a block diagram illustrating an embodiment of a processor.

FIG. 2 is a block diagram of a processor according to an embodiment. Processor 200 may be part of a platform hardware. For example, processor 200 may be processor 104 of platform hardware 120. Processor 200 may be one or more general-purpose processing devices such as a microprocessor, central processing unit, or the like. In some embodiments, processor 200 may be a complex instruction set computing (CISC) microprocessor, reduced instruction set computer (RISC) microprocessor, very long instruction word (VLIW) microprocessor, or processor implementing other instruction sets, or processors implementing a combination of instruction sets. The processor 200 may also be one or more special-purpose processing devices such as an application specific integrated circuit (ASIC), a field programmable gate array (FPGA), a digital signal processor (DSP), network processor, or the like. In one embodiment, processor may include one or more processing cores. The processor may be configured to execute the processing logic for performing some of the operations discussed herein.

Components of processor 200 may include decoder 212, evaluator 214, emulator 216, execution unit(s) 218, and registers 210. The decoder 212 may decode instructions into one or more micro-instructions or micro-ops (uops) to be executed by the execution unit 218. Data associated with the execution of the decoded instruction may be stored in registers 210, which may include general purpose registers (GPRs), vector registers, mask registers, and the like. According to an embodiment, at least some of the registers 210 are used to store SIEEMP rules/configurations 205 that specify how different instructions are to be handled by the processor. The rules may be store in a specific set of registers such as ISA Manager Status Registers (ISA MSRs). Each ISA MSR may store the SIEEMP rules corresponding to a particular instruction or instruction set. For instructions that are not supported by the processor 200, the emulator 216 may provide the capability to emulate certain instruction behavior to mimic the execution of the unsupported instructions.

When a request to execute an instruction is received by processor 200, the evaluator 214 searches the ISA MSRs to locate one or more registers that contain the rules corresponding to the received instruction. This may include comparing certain bits (e.g., index bits) in each ISA MSR with an identifier of the instruction. For each matching rule found, the associated valid bit may be checked to ensure the rule was properly validated, such as by an update manager. Then, based on the matching rules, the evaluator 214 determines how the instruction should be handled (i.e. what actions should be taken with respect to the instruction). For example, a rule may specify that the received instruction is to be executed by the execution unit(s) 218 as normal. In which case, the evaluator 214 may provide an indication to the appropriate downstream components (e.g., decoder 212, execution unit(s) 218, etc.) to execute the received instruction. Alternatively, the rule may specify that the execution of the instruction be emulated. If so, the evaluator 214 may provide an indication to the emulator 214 to convert or translate the received instruction into one or more other instructions which, when executed by the execution unit(s) 218, produce the same result or behavior as if the original instruction was executed. If, however, the rule indicates that the received instruction should be trapped, such that the instruction is not or should not be supported on the processor, the evaluator may cause the instruction to be trapped and removed from the execution pipeline. In some embodiments, the rule may specify that an error message or interrupt be generated, or to trigger some other policy-based actions in accordance with a set of pre-defined policies.

Figure 3:
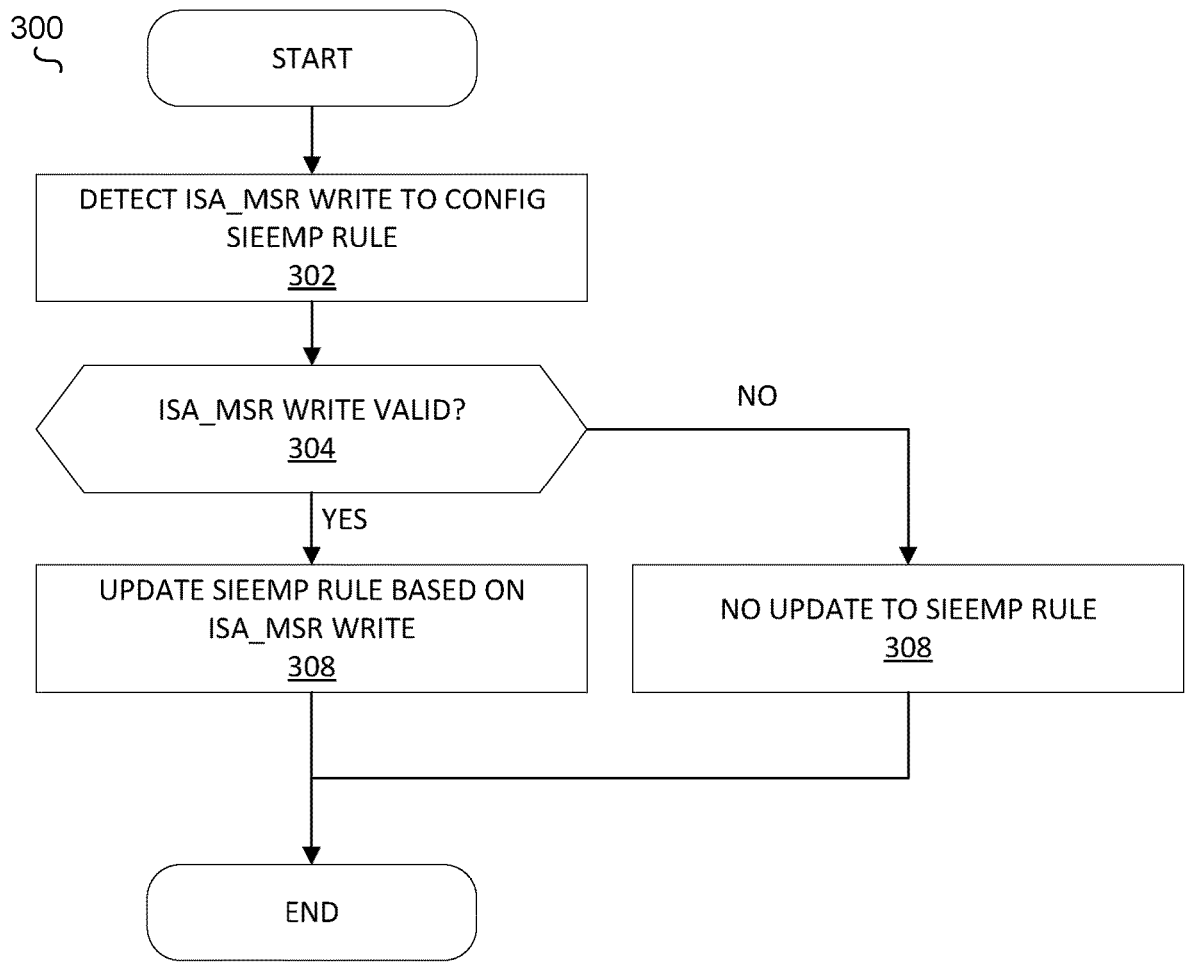
FIG. 3 is a flow diagram illustrating the operations for processing a write request according to an embodiment.

FIG. 3 is a flow diagram illustrating operations for processing a request to write or update SIEEMP rules according to one embodiment of the present invention. The illustrated method 300 may be performed by any processing logic disclosed herein. The processing logic may comprise hardware (e.g., circuitry, dedicated logic, programmable logic, microcode, etc.), software, firmware, or any combination thereof. According to an embodiment, method 300 is performed by an update manager, such as update manager 110 of FIG. 1. The update manager may be implemented as part of the boot input/output system (BIOS). In one embodiment, the update manager is implemented by a unified extensible firmware interface (UEFI) BIOS module.

Method 300 begins at the start block and continues to block 302, where a request to configure an SIEEMP rule/configuration is detected. The request may be write operation from the VMM or OS to enter a new rule, or to update an existing one, by writing to a specific location, such as one of the ISA manager status registers (ISA MSRs) disclosed herein. In one embodiment, the request is detected after the ISA MSR has been modified. In other embodiments, the request is detected and intercepted prior to the actual write operation.

At block 304, validation is performed on the request. The validation may include checking that the rule to be stored or updated corresponds to the processor in the hardware platform. In one embodiment, the request is checked for valid header, loader version, and/or checksum. The request may also be authenticated by validating a signature associated with the request.

If the request is validated, the SIEEMP rule is updated according to the request at block 308. If, however, the request is found invalid, then at block 310, no update is performed to the SIEEMP rule. This may mean that the write request is blocked from modifying the ISA MSR. If the validation is performed after the rule has already been updated, a validation bit may be set accordingly to reflect the validation result.

Figure 4:
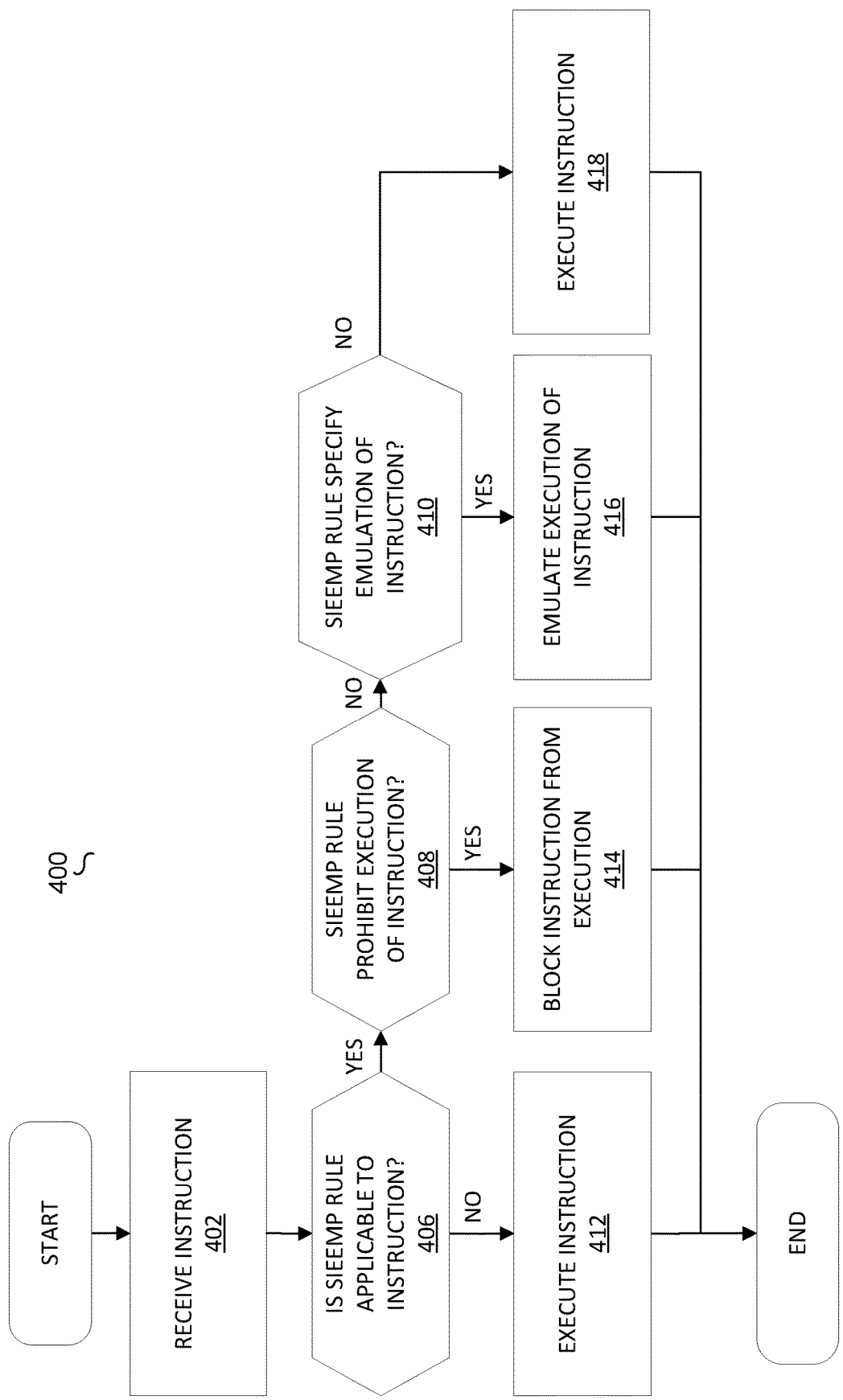
FIG. 4 is a flow diagram illustrating the operations for processing an instruction according to an embodiment.

FIG. 4 is a flow diagram illustrating a method to process an instruction in accordance with embodiments of the present disclosure. According to an embodiment, method 400 is performed by a processing logic which may comprise hardware (e.g., circuitry, dedicated logic, programmable logic, microcode, etc.), software, firmware, or any combination thereof. For example, the processing unit may be processor 104 of FIG. 1 or processor 200 of FIG. 2. Method 400 begins at the start block. Next, at block 402, an instruction is received and at block 404, the received instruction is decoded. The decoded instruction may include one or more micro-operations. At block 406, it is determined whether any SIEEMP rules apply to the instruction. In one embodiment, the ISA MSRs are checked to determine whether any entries match the instruction. In one embodiment, an identifier (e.g., opcode) associated with the instruction is compared against the index of each entry in the ISA MSRs. If there is no match, meaning that no SIEEMP rule applies to the instruction, the instruction is executed by the processing unit at block 412. Specifically, one or more micro-operations from the decoded instruction is processed/executed by execution units of the processing unit. If, however, a match is found at block 406 such that one or more SIEEMP rules apply to the instruction, then at block 408, a determination is made on whether the instruction is allowed to execute based on the SIEEMP rules. If the rules specify that the instruction not allowed to execute, the instruction is trapped at block 414. On the other hand, if the rules specify that the instruction is allowed to execute, then it is further determined, at block 410, whether the rules specify emulation of the instruction. If so, the instruction is emulated and executed at block 416. In one embodiment, the instruction is converted into one or more emulated instructions which are then decoded and executed to provide the same result or behavior as the execution of the original instruction. In another embodiment, one or more micro-operations decoded from the original instruction which are not supported by the processing unit are replaced with supported micro-operations. The processing unit then executes the supported micro-operations instead of the unsupported ones. Referring back to block 410, if no emulation is needed, the decoded instruction is executed at block 218 as normal.

Figure 5:
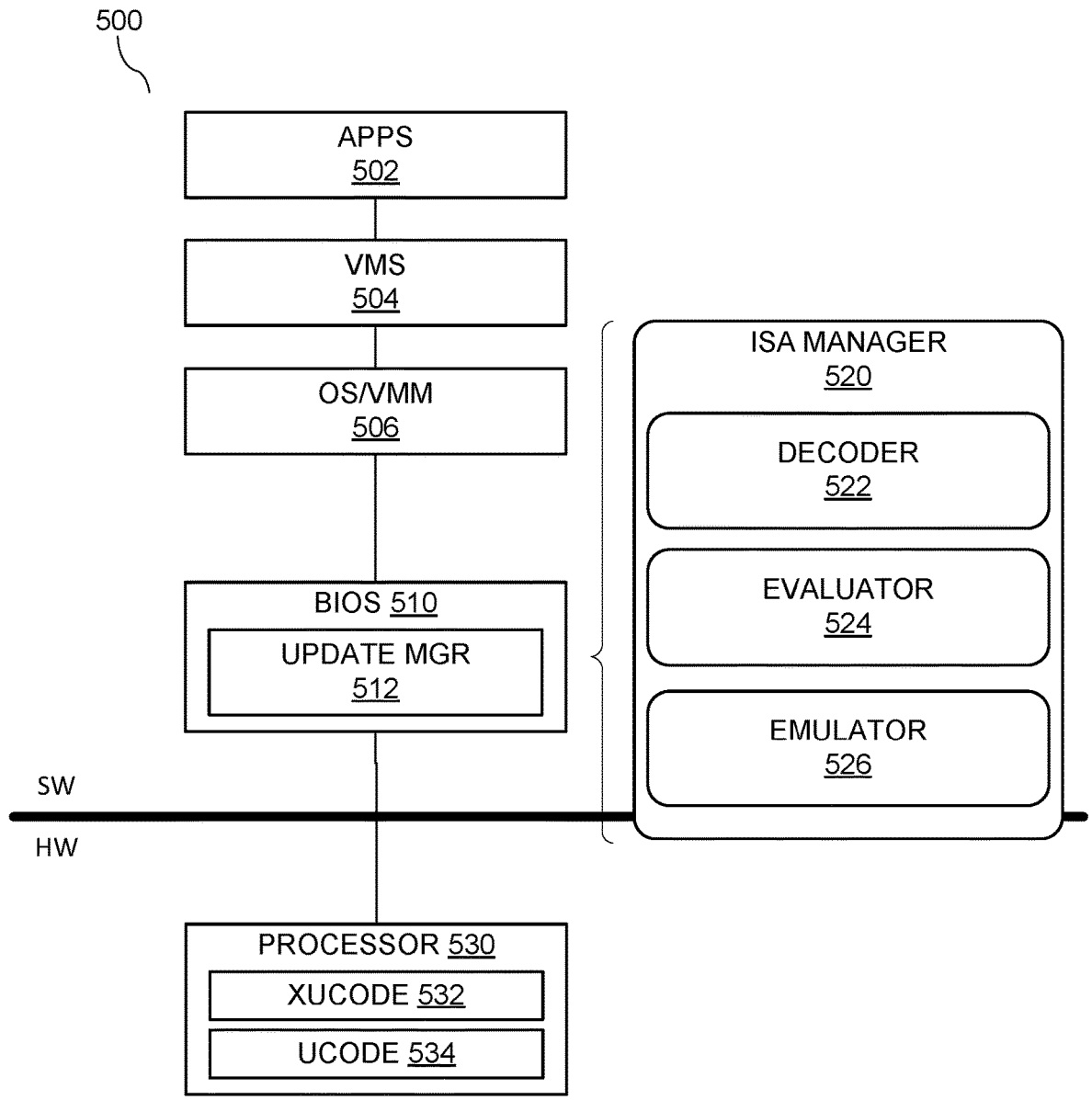
FIG. 5 is a block diagram illustrating a computer system platform according to an embodiment.

FIG. 5 is a block diagram illustrating a computer system platform according to another embodiment. Platform 500 includes a processor or a system on socket (SOC) 530, BIOS module 510, OS/VMM 506, virtual machines (VMs) 504, applications 502, and instruction set architecture (ISA) manager 520. The processor 530 may further include a microcode (ucode) module 534 and/or an extended microcode (xucode) module 532 for processing and executing instructions. The ISA manager 520 additionally includes decoder 522, evaluator 524, emulator 526. The ISA manager and its components may be implemented by hardware, software, firmware, or any combination thereof. In one embodiment, the ISA manager is implemented as a module of the BIOS 510. The BIOS may also include an update manager 512. In one embodiment, BIOS 510 is an UEFI BIOS module.

According to an embodiment, a host VMM or OS 506 that requires specific ISA prevention or emulation requests entry into an ISA Manager 520 by requesting a write to an ISA Manager Status Register (ISA MSR) and triggering the entry. The ISA referred to herein may be a particular instruction or instruction set. Responsive to the write request, update manager 512 handles one or more ISA Message Signaled Interrupts (MSI) generated by the ISA MSR trigger and performs various validations. For example, the update manager may ensure that the ISA manager matches the processor in the platform. The update manager may also check whether the write request and/or the ISA manager has the valid header, loader version, and/or checksum. The authenticity and signature of the request and/or the ISA manager may also be checked. After the write request and/or the ISA manager have been validated, the write request is executed and the ISA MSR updated.

Next, according to an embodiment, the ISA manager 520 decodes the ISA and determines how to handle the ISA based on the bits set by the host VMM or OS. For example, the bits may indicate whether the ISA should be allowed to execute, be emulated, or be blocked. Moreover, based on the bits, the ISA manager may also generate an exception or interrupt, or to take other configurable policy-based actions. Based on the bits, the ISA manager takes the appropriate action(s) including generating new micro-operations using the emulator for execution. Post configuration, the ISA manager may perform a host-MSR write to trigger unload of the ISA manager and associated apps. Thereafter, control is returned to the host VMM or OS.

Figure 6:
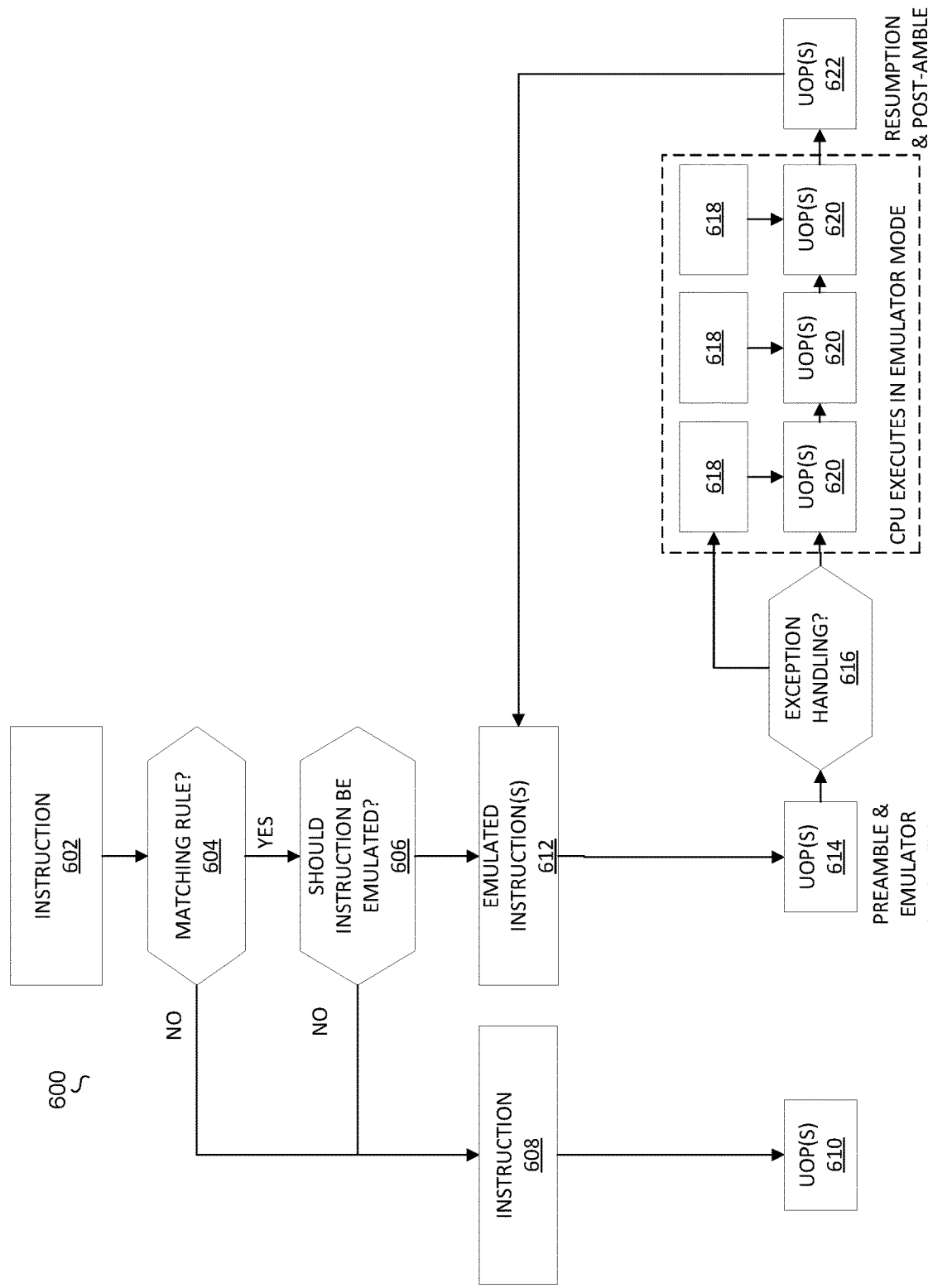
FIG. 6 is flow diagram illustrating an embodiment of the present invention.

FIG. 6 is flow diagram illustrating an embodiment of the present invention. At block 602, an instruction is detected. A search of the SIEEMP rules is performed at 604 to determine whether one or more rules match the instruction. If no match is found, then instruction 608 is decoded into a one or more micro-ops 610 and executed. If one or more matching rules are found at 604, then, at block 606, a determination is made on whether the instruction needs to be emulated. If emulation is not required, then the instruction 608 is decoded into one or more micro-ops 610 and executed. If instruction is to be emulated, then instruction is converted into one or more emulated instructions 612. The emulated instructions are then decoded into micro-ops 614. If exception handling is required, one or more emulated instructions 618 may be executed. If no exception handling is required, the micro-ops 620, 622 are executed.

EXAMPLES

The following are example implementations of different embodiments of the invention.

Example 1. A processor that includes one or more registers, an evaluator, and an execution unit. The one or more registers are to store rules which specify actions to be taken with respect to one or more instructions. The evaluator is to detect a request to execute a first instruction and to evaluate the first instruction based on the rules stored in the one or more registers. The evaluator is further to block execution of the first instruction when a first rule corresponding to the first instruction specifies that execution of the first instruction is prohibited, and to allow execution of the first instruction when there is no rule in the one or more registers specifying that the execution of the first instruction is prohibited. The execution unit is to execute the first instruction when the evaluator allows execution of the first instruction.

Example 2. The processor of Example 1, further including an emulator to replace the first instruction with one or more emulated instructions when the first rule specifies that the execution of the first instruction is to be emulated. The one or more emulated instructions, when executed by the execution unit, are to provide the same result or behavior as executing the first instruction.

Example 3. The processor of Example 2, wherein the execution unit is to execute the one or more emulated instructions instead of the first instruction when the first rule specify that the execution of the first instruction is to be emulated.

Example 4. The processor of Example 3, further including a decoder to decode the first instruction and/or the one or more emulated instructions.

Example 5. The processor of Example 1, further including an update manager to detect a write request to modify the rules in the one or more registers and to validate information associated with the write request, wherein the update manager is to prevent the write request from modifying the rules upon a failed validation.

Example 6. The processor of Example 5, wherein the update manager is to validate header, loader version, and/or checksum of the write request.

Example 7. The processor of Example 5, wherein the update manager is to validate that the write request is appropriate for the processor.

Example 8. The processor of Example 5, wherein the write request is received from a host operating system (OS) or a virtual machine manager (VMM) to specify actions to be taken with respect to the one or more instructions.

Example 9. The processor of Example 5, wherein the update manager is part of a basic input/output system (BIOS) module.

Example 10. The processor of Example 1, wherein the evaluator is further to generate a message or interrupt when specified by the first rule and/or when the first rule specifies that execution of the first instruction is prohibited.

Example 11. The processor of Example 1, wherein the evaluator is further to trigger policy-based actions when specified by the first rule.

Example 12. The processor of Example 1, wherein the one or more registers comprise one-time writable registers that locks after a write.

Example 13. A method that includes: storing rules in one or more registers, the rules to specify actions to be taken with respect to a one or more instructions; detecting a request to execute a first instruction and responsively evaluate the first instruction based on the rules stored in the one or more registers; blocking execution of the first instruction when a first rule corresponding to the first instruction specifies that execution of the first instruction is prohibited; allowing executing of the first instruction when there is no rule in the one or more registers specifying that the execution of the first instruction is prohibited; and executing first instruction when execution of the first instruction is allowed.

Example 14. The method of Example 13, further including replacing the first instruction with one or more emulated instructions when the first rule specifies that the execution of the first instruction is to be emulated, wherein an execution of the one or more emulated instructions is to provide a same result as an execution of the first instruction.

Example 15. The method of Example 14, further including executing the one or more emulated instructions instead of the first instruction when the first rule specify that the execution of the first instruction is to be emulated.

Example 16. The method of Example 15, further including decoding the first instruction and/or one or more emulated instructions.

Example 17. The method of Example 13, further including detecting a write request to modify the rules in the one or more registers; validating information associated with the write request; and preventing the write request from modifying the rules upon a failed validation.

Example 18. The method of Example 17, further including validating header, loader version, and/or checksum of the write request.

Example 19. The method of Example 17, wherein the write request is received from a host operating system (OS) or virtual machine manager (VMM) to specify actions to be taken with respect to the one or more instructions.

Example 20. The method of Example 13, further including generating a message or interrupt when specified by the first rule and/or when the first rule specifies that execution of the first instruction is prohibited.

Example 21. The method of Example 13, further including triggering policy-based actions when specified by the first rule.

Example 22. The method of Example 13, wherein the one or more registers comprise one-time writable registers that locks after a write.

Example 23. A non-transitory machine-readable medium having program code stored thereon which, when executed by a machine, causes the machine to perform operations of: storing rules in one or more registers, the rules to specify actions to be taken with respect to a one or more instructions; detecting a request to execute a first instruction and responsively evaluate the first instruction based on the rules stored in the one or more registers; blocking execution of the first instruction when a first rule corresponding to the first instruction specifies that execution of the first instruction is prohibited; allowing executing of the first instruction when there is no rule in the one or more registers specifying that the execution of the first instruction is prohibited; and executing first instruction when execution of the first instruction is allowed.

Example 24. The non-transitory machine-readable medium of Example 23, wherein the operations further include replacing the first instruction with one or more emulated instructions when the first rule specifies that the execution of the first instruction is to be emulated, wherein an execution of the one or more emulated instructions is to provide a same result as an execution of the first instruction.

Example 25. The non-transitory machine-readable medium of Example 24, wherein the operations further include replacing the first instruction with one or more emulated instructions when the first rule specifies that the execution of the first instruction is to be emulated, wherein an execution of the one or more emulated instructions is to provide a same result as an execution of the first instruction.

Example 26. The non-transitory machine-readable medium of Example 25, wherein the operations further include executing the one or more emulated instructions instead of the first instruction when the first rule specify that the execution of the first instruction is to be emulated.

Example 27. The non-transitory machine-readable medium of Example 26, wherein the operations further includes decoding the first instruction and/or one or more emulated instructions.

Example 28. The non-transitory machine-readable medium of Example 23, wherein the operations further include detecting a write request to modify the rules in the one or more registers; validating information associated with the write request; and preventing the write request from modifying the rules upon a failed validation.

Example 29. The non-transitory machine-readable medium of Example 28, wherein the operations further include validating header, loader version, and/or checksum of the write request.

Example 30. The non-transitory machine-readable medium of Example 28, wherein the write request is received from a host operating system (OS) or virtual machine manager (VMM) to specify actions to be taken with respect to the one or more instructions.

Example 31. The non-transitory machine-readable medium of Example 23, wherein the operations further include generating a message or interrupt when specified by the first rule and/or when the first rule specifies that execution of the first instruction is prohibited.

Example 32. The non-transitory machine-readable medium of Example 23, wherein the operations further include triggering policy-based actions when specified by the first rule.

Example 33. The non-transitory machine-readable medium of Example 23, wherein the one or more registers include one-time writable registers that locks after a write.

Exemplary Processor Architectures and Data Types

Figures 7A, 7B:
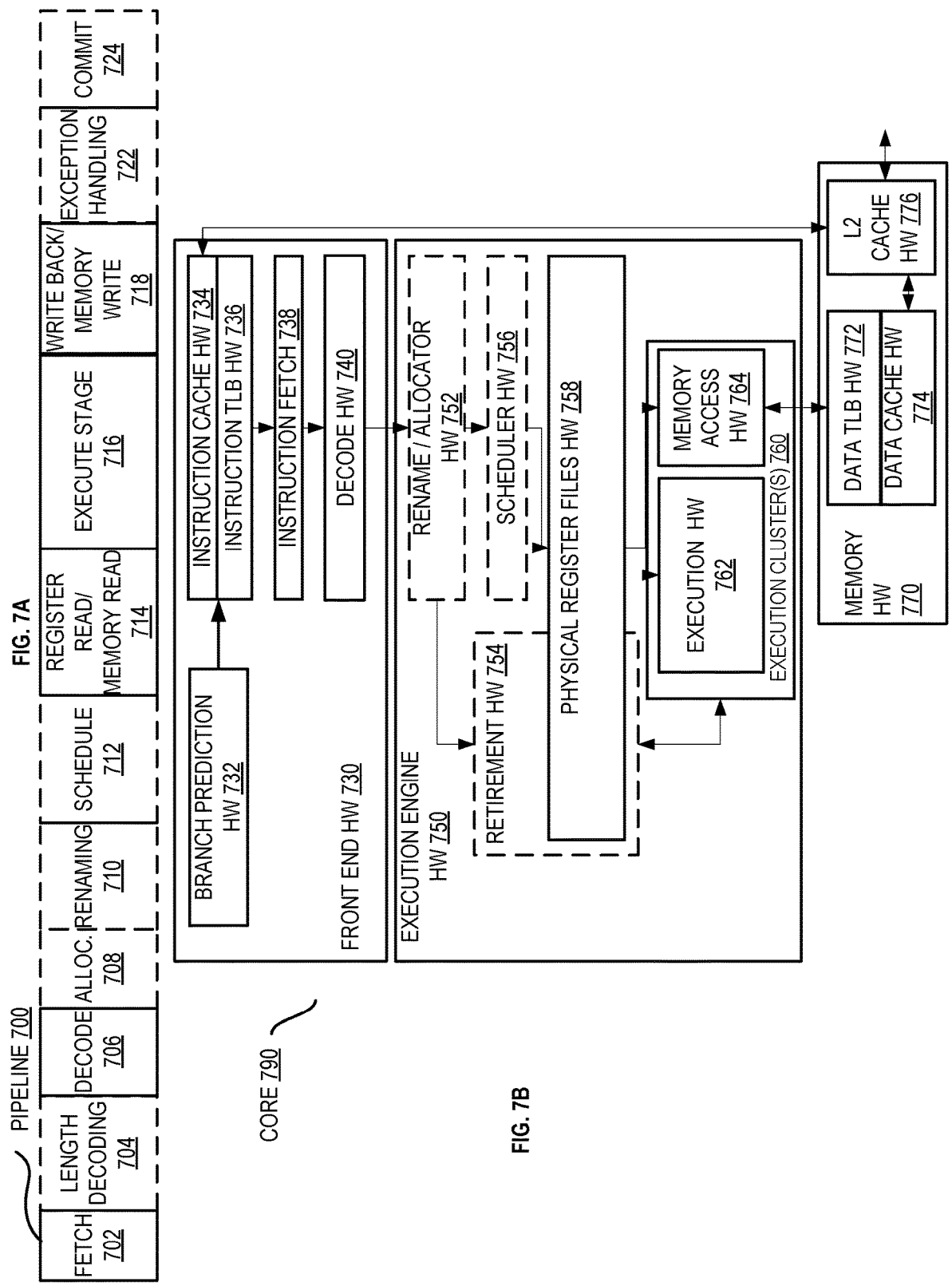
FIG. 7A is a block diagram illustrating both an exemplary in-order pipeline and an exemplary register renaming, out-of-order issue/execution pipeline according to embodiments of the invention.
FIG. 7B is a block diagram illustrating both an exemplary embodiment of an in-order architecture core and an exemplary register renaming, out-of-order issue/execution architecture core to be included in a processor according to embodiments of the invention.

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end hardware 730 coupled to an execution engine hardware 750, and both are coupled to a memory hardware 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end hardware 730 includes a branch prediction hardware 732 coupled to an instruction cache hardware 734, which is coupled to an instruction translation lookaside buffer (TLB) 736, which is coupled to an instruction fetch hardware 738, which is coupled to a decode hardware 740. The decode hardware 740 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode hardware 740 or otherwise within the front end hardware 730). The decode hardware 740 is coupled to a rename/allocator hardware 752 in the execution engine hardware 750.

The execution engine hardware 750 includes the rename/allocator hardware 752 coupled to a retirement hardware 754 and a set of one or more scheduler hardware 756. The scheduler hardware 756 represents any number of different schedulers, including reservations stations, central instruction window, etc. The scheduler hardware 756 is coupled to the physical register file(s) hardware 758. Each of the physical register file(s) hardware 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 758 comprises a vector registers hardware, a write mask registers hardware, and a scalar registers hardware. This register hardware may provide architectural vector registers, vector mask registers, and general purpose registers. The physical register file(s) hardware 758 is overlapped by the retirement hardware 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 754 and the physical register file(s) hardware 758 are coupled to the execution cluster(s) 760. The execution cluster(s) 760 includes a set of one or more execution hardware 762 and a set of one or more memory access hardware 764. The execution hardware 762 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 756, physical register file(s) hardware 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 764). It should also be understood that where separate pipelines are used, one or more of these pipelines may be out-of-order issue/execution and the rest in-order.

The set of memory access hardware 764 is coupled to the memory hardware 770, which includes a data TLB hardware 772 coupled to a data cache hardware 774 coupled to a level 2 (L2) cache hardware 776. In one exemplary embodiment, the memory access hardware 764 may include a load hardware, a store address hardware, and a store data hardware, each of which is coupled to the data TLB hardware 772 in the memory hardware 770. The instruction cache hardware 734 is further coupled to a level 2 (L2) cache hardware 776 in the memory hardware 770. The L2 cache hardware 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode hardware 740 performs the decode stage 706; 3) the rename/allocator hardware 752 performs the allocation stage 708 and renaming stage 710; 4) the scheduler hardware 756 performs the schedule stage 712; 5) the physical register file(s) hardware 758 and the memory hardware 770 perform the register read/memory read stage 714; the execution cluster 760 perform the execute stage 716; 6) the memory hardware 770 and the physical register file(s) hardware 758 perform the write back/memory write stage 718; 7) various hardware may be involved in the exception handling stage 722; and 8) the retirement hardware 754 and the physical register file(s) hardware 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 734/774 and a shared L2 cache hardware 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
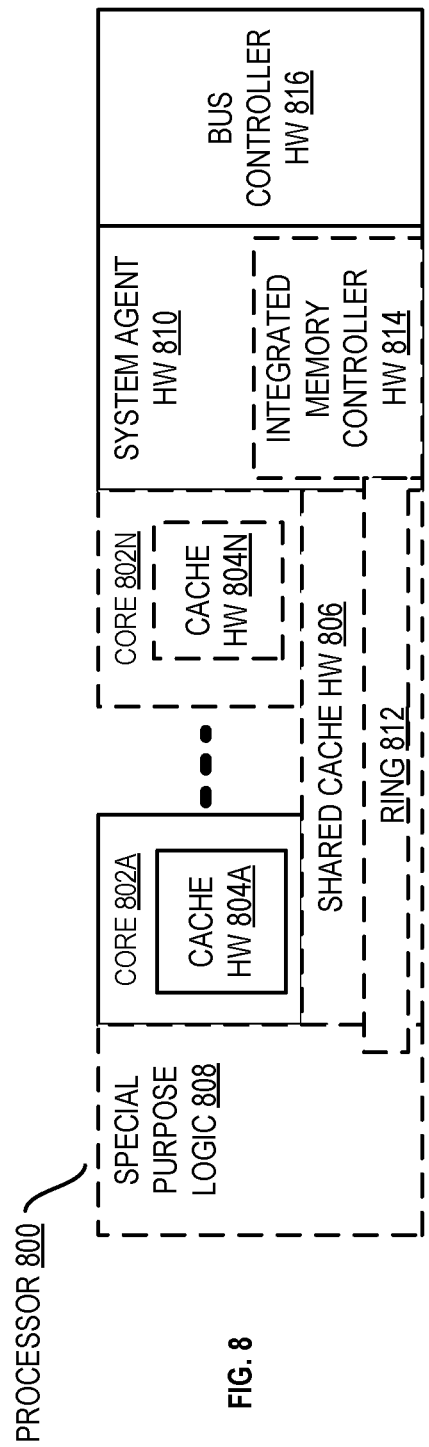
FIG. 8 is a block diagram of a single core processor and a multicore processor with integrated memory controller and graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller hardware 816, while the optional addition of the dashed lined boxes illustrates an alternative processor 800 with multiple cores 802A-N, a set of one or more integrated memory controller hardware 814 in the system agent hardware 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 806, and external memory (not shown) coupled to the set of integrated memory controller hardware 814. The set of shared cache hardware 806 may include one or more mid-level caches, such as level 2 (L2), level 3 (L3), level 4 (L4), or other levels of cache, a last level cache (LLC), and/or combinations thereof. While in one embodiment a ring based interconnect hardware 812 interconnects the integrated graphics logic 808, the set of shared cache hardware 806, and the system agent hardware 810/integrated memory controller hardware 814, alternative embodiments may use any number of well-known techniques for interconnecting such hardware. In one embodiment, coherency is maintained between one or more cache hardware 806 and cores 802-A-N.

In some embodiments, one or more of the cores 802A-N are capable of multi-threading. The system agent 810 includes those components coordinating and operating cores 802A-N. The system agent hardware 810 may include for example a power control unit (PCU) and a display hardware. The PCU may be or include logic and components needed for regulating the power state of the cores 802A-N and the integrated graphics logic 808. The display hardware is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set. In one embodiment, the cores 802A-N are heterogeneous and include both the "small" cores and "big" cores described below.

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
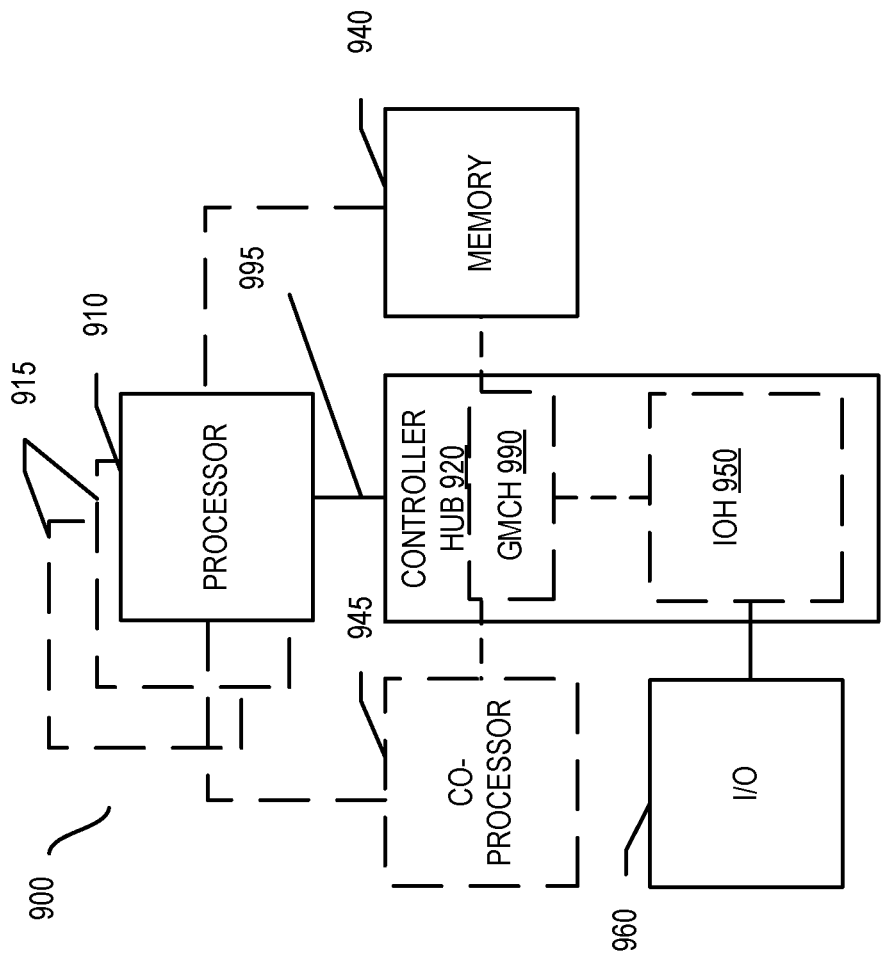
FIG. 9 illustrates a block diagram of a system in accordance with one embodiment of the present invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface, or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
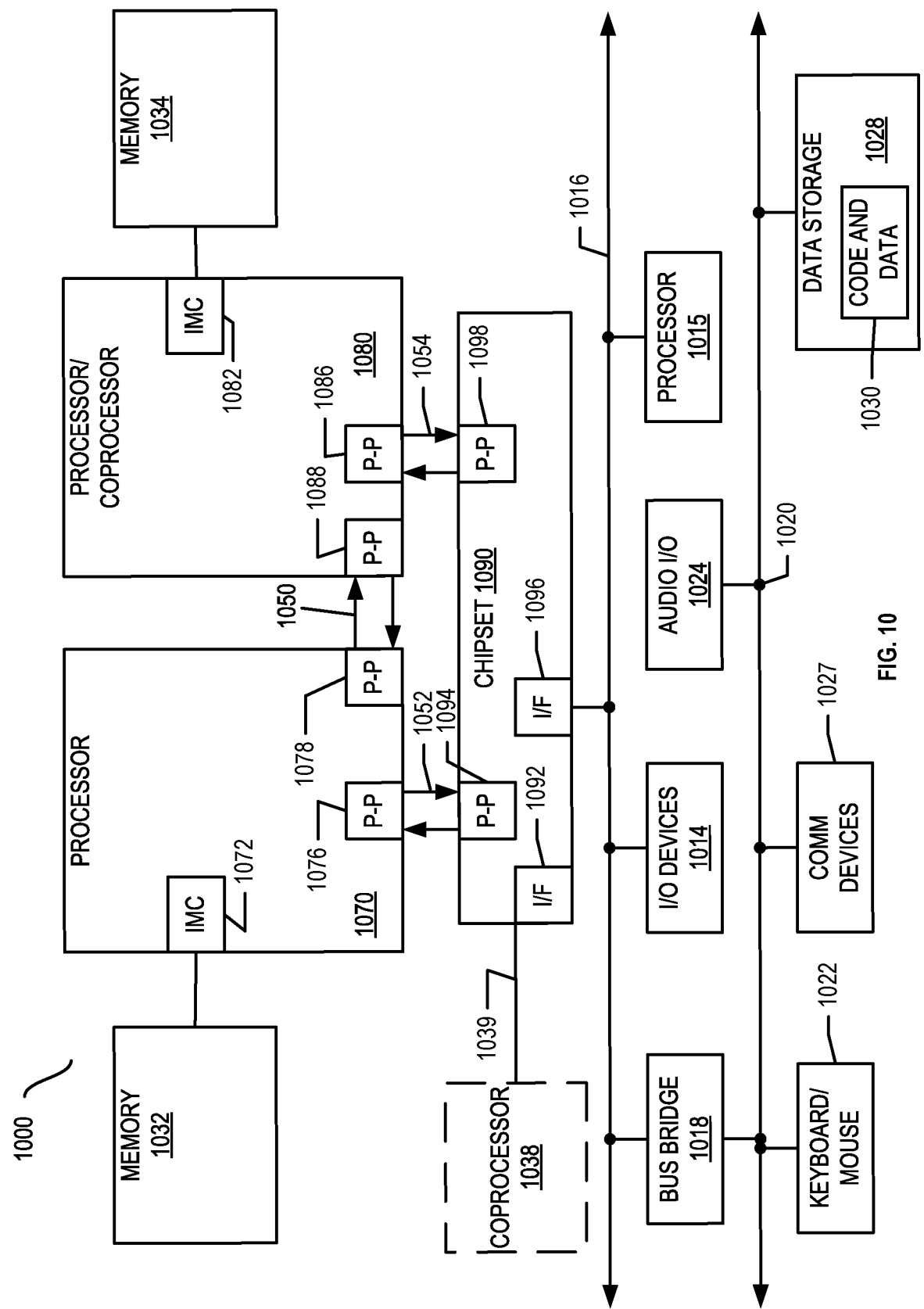
FIG. 10 illustrates a block diagram of a second system in accordance with an embodiment of the present invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) hardware 1072 and 1082, respectively. Processor 1070 also includes as part of its bus controller hardware point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) hardware), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage hardware 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
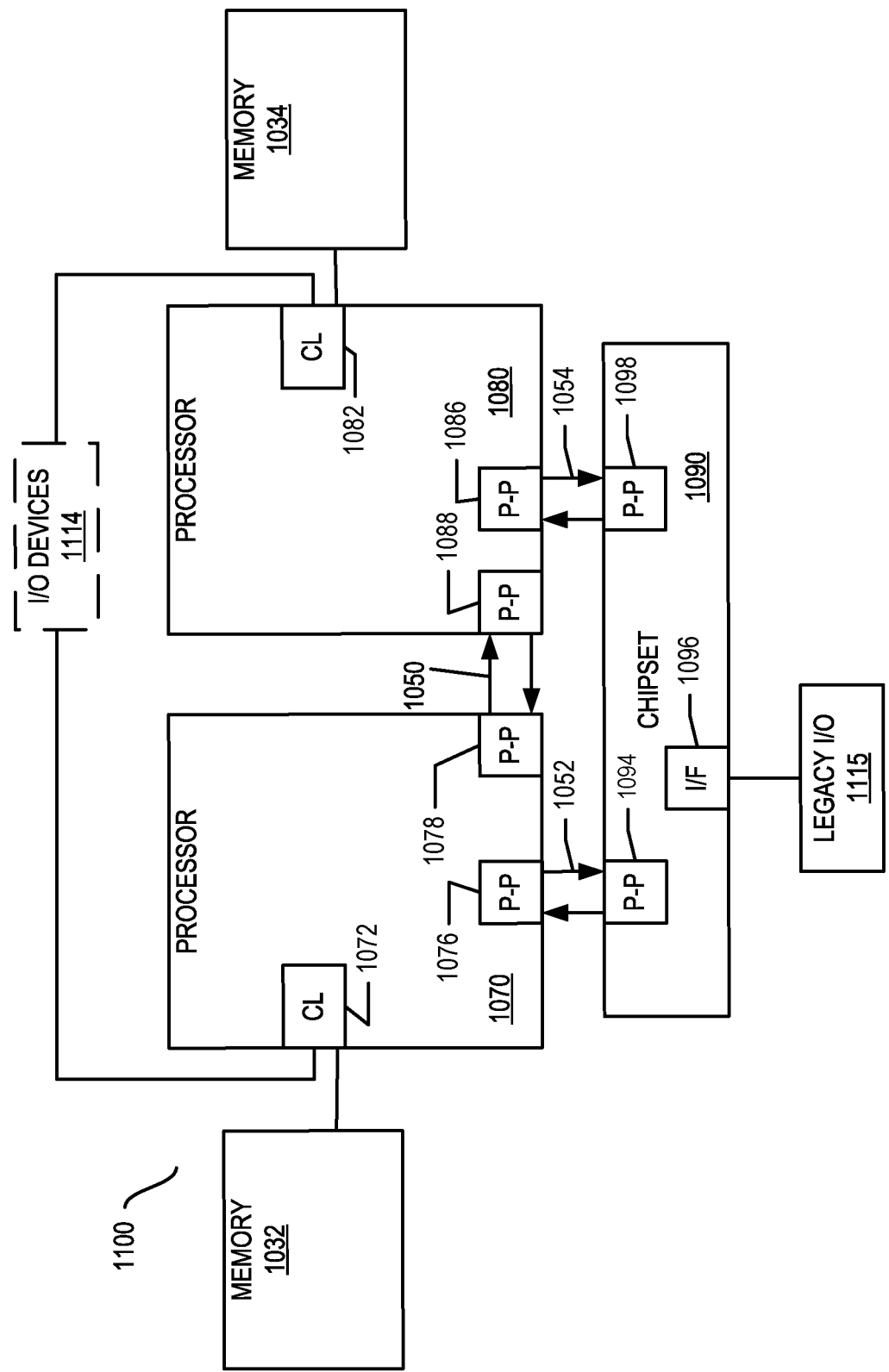
FIG. 11 illustrates a block diagram of a third system in accordance with an embodiment of the present invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller hardware and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
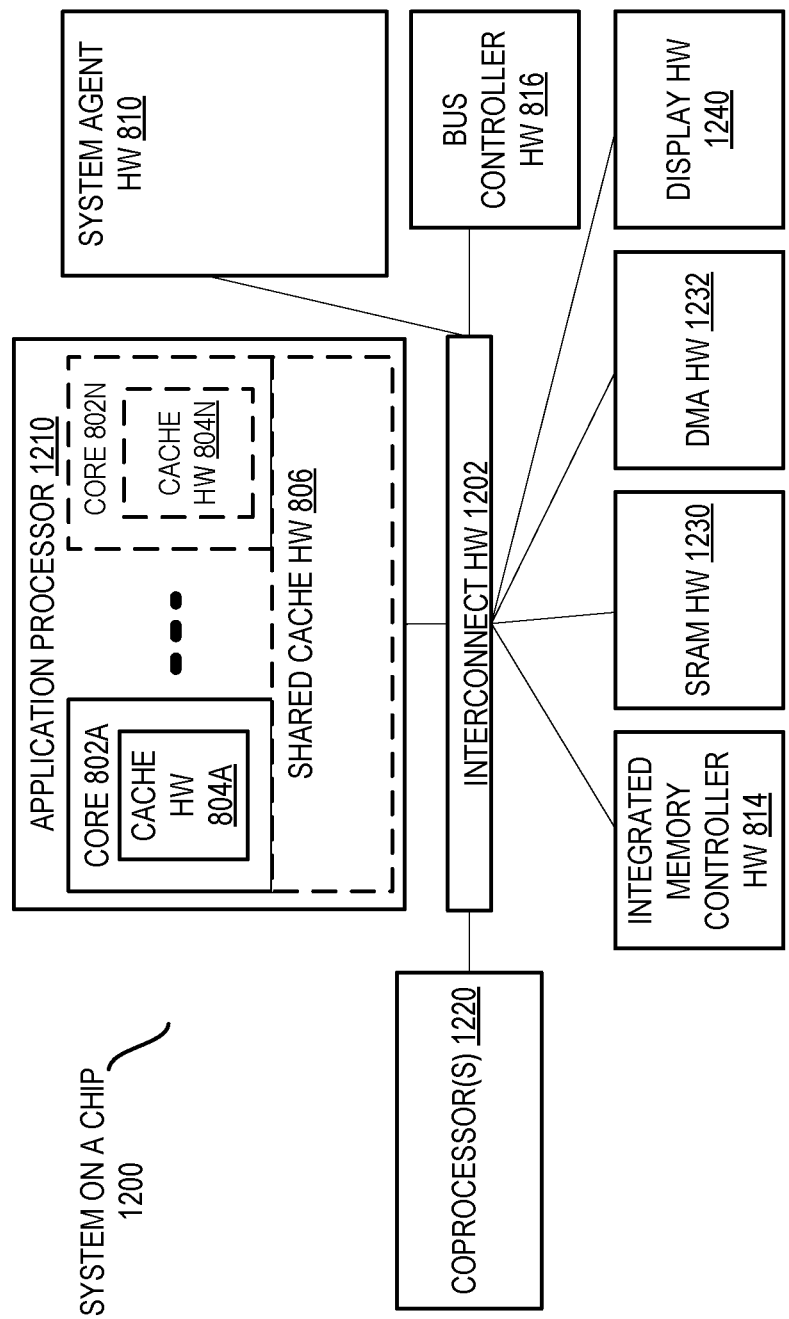
FIG. 12 illustrates a block diagram of a system on a chip (SoC) in accordance with an embodiment of the present invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect hardware 1202 is coupled to: an application processor 1210 which includes a set of one or more cores 802A-N and shared cache hardware 806; a system agent hardware 810; a bus controller hardware 816; an integrated memory controller hardware 814; a set or one or more coprocessors 1220 which may include integrated graphics logic, an image processor, an audio processor, and a video processor; an static random access memory (SRAM) hardware 1230; a direct memory access (DMA) hardware 1232; and a display hardware 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, CA and/or that execute the ARM instruction set of ARM Holdings of Sunnyvale, CA). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

The invention claimed is:

1. An apparatus comprising:
one or more registers to store rules specifying actions to be taken with respect to one or more instructions, a rule within the rules stored within the one or more registers to indicate one or more actions to be taken with respect to a matching instruction and an index to match an identifier of the matching instruction;
an evaluator to detect a request to execute a first instruction and to evaluate the first instruction based on the rules stored in the one or more registers, wherein upon a first rule corresponding to the first instruction specifying that execution of the first instruction is prohibited, the evaluator is to block execution of the first instruction, upon the first rule corresponding to the first instruction specifying that the execution of the first instruction is to be emulated, the evaluator is to cause the first instruction to be replaced with one or more emulated instructions, and upon no rule being found in the one or more registers applicable to the first instruction, the evaluator is to allow execution of the first instruction; and
an execution unit to execute the first instruction when the evaluator allows execution of the first instruction.

2. The apparatus of claim 1, further comprising an emulator to replace the first instruction with the one or more emulated instructions, wherein an execution of the one or more emulated instructions by the execution unit is to provide a same result as an execution of the first instruction.

3. The apparatus of claim 1, wherein upon the first rule corresponding to the first instruction not specifying that the execution of the first instruction is to be emulated, the execution unit is to execute the first instruction.

4. The apparatus of claim 1, further comprising a decoder to decode the first instruction or the one or more emulated instructions.

5. The apparatus of claim 1, further comprising an update manager to detect a write request to modify the rules in the one or more registers and to validate information associated with the write request, wherein the update manager is to prevent the write request from modifying the rules upon a failed validation.

6. The apparatus of claim 5, wherein the update manager is to validate header, loader version, and/or checksum of the write request.

7. The apparatus of claim 5, wherein the update manager is to validate that the write request is appropriate for a processor in which the execution unit is implemented.

8. The apparatus of claim 5, wherein the write request is received from a host operating system (OS) or a virtual machine manager (VMM) to specify actions to be taken with respect to the one or more instructions.

9. The apparatus of claim 5, wherein the update manager is part of a basic input/output system (BIOS) module.

10. The apparatus of claim 1, wherein the evaluator is further to generate a message or interrupt when specified by the first rule or when the first rule specifies that execution of the first instruction is prohibited.

11. The apparatus of claim 1, wherein the evaluator is further to trigger policy-based actions when specified by the first rule.

12. The apparatus of claim 1, wherein the one or more registers comprise one-time writable registers that locks after a write.

13. A method comprising:
storing rules in one or more registers, the rules to specify actions to be taken with respect to one or more instructions, a rule within the rules stored within the one or more registers to indicate one or more actions to be taken with respect to a matching instruction and an index to match an identifier of the matching instruction;
detecting a request to execute a first instruction and responsively evaluate the first instruction based on the rules stored in the one or more registers;
upon a first rule corresponding to the first instruction specifying that execution of the first instruction is prohibited, blocking execution of the first instruction;
upon the first rule corresponding to the first instruction specifying that the execution of the first instruction is to be emulated, causing the first instruction to be replaced with one or more emulated instructions; and
upon no rule being found in the one or more registers applicable to the first instruction, executing the first instruction.

14. The method of claim 13, wherein an execution of the one or more emulated instructions is to provide a same result as an execution of the first instruction.

15. The method of claim 13, upon the first rule corresponding to the first instruction not specifying that the execution of the first instruction is to be emulated, the first instruction is executed.

16. The method of claim 13, further comprising:
decoding the first instruction or one or more emulated instructions.

17. The method of claim 13, further comprising:
detecting a write request to modify the rules in the one or more registers;
validating information associated with the write request; and
preventing the write request from modifying the rules upon a failed validation.

18. The method of claim 17, further comprising validating header, loader version, and/or checksum of the write request.

19. The method of claim 17, wherein the write request is received from a host operating system (OS) or virtual machine manager (VMM) to specify actions to be taken with respect to the one or more instructions.

20. The method of claim 13, further comprising:
generating a message or interrupt as specified by the first rule or responsive to the first rule specifying that execution of the first instruction is prohibited.

21. The method of claim 13, further comprising triggering policy-based actions as specified by the first rule.

22. The method of claim 13, wherein the one or more registers comprise one-time writable registers that locks after a write.

23. A system comprising:
a memory to store one or more applications, each application comprising instructions to be executed;
one or more registers to store rules specifying actions to be taken with respect to one or more instructions, a rule within the rules stored within the one or more registers to indicate one or more actions to be taken with respect to a matching instruction and an index to match an identifier of the matching instruction;

an evaluator to detect a request to execute a first instruction and to evaluate the first instruction based on the rules stored in the one or more registers, wherein upon a first rule corresponding to the first instruction specifying that execution of the first instruction is prohibited, the evaluator is to block execution of the first instruction, upon the first rule corresponding to the first instruction specifying that the execution of the first instruction is to be emulated, the evaluator is to cause the first instruction to be replaced with one or more emulated instructions, and upon no rule being found in the one or more registers applicable to the first instruction, the evaluator is to allow execution of the first instruction; and an execution unit to execute the first instruction when upon the evaluator allows allowing execution of the first instruction.

24. The system of claim 23, further comprising an emulator to replace the first instruction with the one or more emulated instructions, wherein an execution of the one or more emulated instructions by the execution unit is to provide a same result as an execution of the first instruction.

25. The system of claim 23, wherein upon the first rule corresponding to the first instruction not specifying that the execution of the first instruction is to be emulated, the execution unit is to execute the first instruction.

* * * * *